United States Patent Office 3,658,860
Patented Apr. 25, 1972

3,658,860
TRIALKYL TIN AND LEAD (HALOGENATED) PHTHALATES
Hermann Otto Wirth, Bensheim-Auerbach, and Hans Helmut Friedrich and Veronika Mras, Lindenfels Odenwald, Germany, assignors to Deutsche Advance Produktion GmbH, Lautern/Odenwald, Germany
No Drawing. Filed July 20, 1970, Ser. No. 56,746
Claims priority, application Germany, July 23, 1969,
P 19 37 307.0
Int. Cl. C07f 7/22, 7/24
U.S. Cl. 260—429.7                                        10 Claims

ABSTRACT OF THE DISCLOSURE

Compounds corresponding to the formula

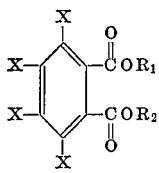

wherein X is a halogen atom such as chlorine, bromine or iodine, $R_2$ is a straight or branched, saturated or unsaturated alkyl radical having 1 to 20 carbon atoms and maybe the same as $R_1$ or H when R' is phenyl and $R_1$ is a triorganotin or triorganolead radical of the formula —Sn(R')$_3$ or —Pb(R')$_3$ wherein R' is a lower straight or branched primary or secondary saturated alkyl radical with 2 to 5 carbon atoms, or phenyl are useful as biocides in antifouling paints, synthetic resins, and synthetic rubber, natural and synthetic fabrics, paper and paper products, impregnants, wood preservatives and the like.

---

The present invention relates to new and extremely effective biocides. This invention more particularly relates to organotin or organolead biocides having physical properties, such as solubility and compatibility, which are improved over known biocides.

The biocidal action of triorganotin and triorganolead compounds is known. Organotin and organolead compounds commonly used have distinct disadvantages e.g., bis-(tributyltin)-oxide (TBTO) has an odor, which is caused because of high vapor pressure, that is objectionable. Since this compound has a strong tendency to migrate or vaporize, it rapidly separates from the substrates that have been treated therewith. This is particularly disadvantageous for antifouling uses, and paints containing TBTO become smeary. A further disadvantage which applies both to known triorganotin and triorganolead compounds is the limited spectrum of activity. Thus known triorganolead salts provide effective antifouling protection only in combination with copper oxide and TBTO does not provide an adequate algicidal action. This is generally true of all triorganotin and triorganolead compounds and severely limits their applicability.

Attempts to extend the range of activity, for example to increase the fungicidal activity of triphenyl tin compounds by mixing with aromatic halogen compounds such as 1,3-dicyano - 2,4,5,6 - tetra-chlorbenzene have been made. Like efforts have also been made for triphenyl and tributyl tin compounds, where synergistic components i.e. aromatic chlorine compounds, such as chlorobenzene, chlorotoluene and trichlorobenzene. The use of a plurality of biocides in a mixture presents problems because the components differ in physical properties, such as solubility and diffusibility which causes the components—for example in an antifouling paint—to leach out at different rates causing the synergistic action to be lost. Furthermore, in such mixtures aromatic compounds have a very strong odor and cause odor problems that are substantial.

We have unexpectedly discovered that the synergism which is developed by aromatic halide compounds on the biocidal effects of organotin compounds is substantially increased, if combined intramolecularly as triorganotin tetrachlorophthalates. We have also found that this increased synergism also occurs in corresponding triorganolead compounds. This is also true for corresponding compounds of tetrabromine and tetraiodophthalic acid. The tetraiodophthalic acid derivatives of the triorganometallic compounds are also outstanding because of their particularly strong action.

This intramolecular combination eliminates separation of the synergistic components through varying rates of migration; the molecule size solves the problem of odor because these salt-like substances have very low vapor pressures and finally, the structural principle of tetrahalophthalic acids presents the possibility of varying other physical properties, such as solubility and compatibility in order to provide a product which is available having optimal properties and a multiplicity of uses.

The present invention therefore concerns triorganotin and triorganolead derivatives which are derived from the tetrahalogen phthalic acid and which are characterized by a surprisingly strong and versatile biocidal effectiveness. The basic structure of these compounds also permits, without lessening the biocidal effect, changes to vary solubility, compatibility and melting point of the compounds.

The biocides of the invention correspond to the formula:

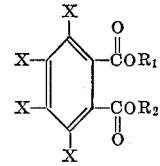

wherein X is a halogen atom such as chlorine, bromine or iodine, $R_2$ is a straight or branched, saturated or unsaturated alkyl radical having 1 to 20 carbon atoms and $R_1$ is a triorganotin or triorganolead radical of the formula —Sn(R')$_3$ or —Pb(R')$_3$ wherein R' is a lower straight or branched primary or secondary saturated alkyl radical with 2 to 5 carbon atoms, or phenyl.

Suitable alkyl radicals for R' include ethyl, n-propyl, iso-propyl, n-butyl, sec.-butyl, iso-butyl, n-amyl, 2-methylbutyl, 3-methylbutyl, amyl-3, amyl-2 and neopentyl.

Examples of $R_2$ include methyl, propyl n-amyl, n-heptyl, n-decyl, lauryl, n-pentadecyl, n-octadecyl, n-eikosanyl, 1-butyl, 2-ethylhexyl, 2-butyloctyl, 2-hexyldecyl, 2-octyldodecyl; 3-methylamyl, 3,7-dimethyloctyl, 3,7,11-trimethyldodecyl, n-butenyl-(2), 3-methylbutene-(3)-yl-(1), hexenyl, heptenyl, undecylenyl, 2,8-dimethyl-nonatrien-(1,4, 8)-yl, phytyl, geranyl, farnesyl. If the $R_2$ radical is saturated, it may contain chlorine, bromine, or phenyl radicals substituted for 1 or more hydrogens. Examples of substituted $R_2$ radicals include 2,3-dichloropropyl, 2,2,2-trichloroethyl, 2-bromodiethyl, 3,7-dimethyl-2,3,6,7-tetrachloroctyl and higher alkyls with varying degrees of chlorination obtained from the photochlorination of higher alkyl acetates and 2-phenylethyl. $R_2$ may also be an oxaalkyl radical such as 3-methoxybutyl, 3,6-dioxaoctyl, 3,6,9-trioxaundecyl, polymers of ethylene oxide with an average molecular weight up to 600, which generally corresponds to a chain containing 50 atoms, -(phenoxy)-ethyl; -(4-chlorophenoxy)-ethyl and 2-(perchlorophenoxy)-propyl- (1).

When R' is not a phenyl, $R_2$ can be identical with $R_1$ and when R' is a phenyl, $R_2$ can be hydrogen.

The compounds of the present invention are readily prepared by known methods.

In the compounds which contain 2 trialkyltin groups, synthesis occurs by combination of the corresponding bis-(trialkyl-tin)-oxide with the tetrahalo phthalic acid anhydride. The reaction can also be conducted in a solvent such as toluene, tetrahydrofuran. petroleum ether, cyclohexane or acetone. Since the corresponding trialkyllead oxides or hydroxides are unstable they are more advantageously prepared from the acetates which, in the presence of soda, smoothly react with tetrahalo phthalic acid anhydrides.

The synthesis of triphenyltin or triphenyllead tetrahalogen phthalates likewise occurs with utmost simplicity. The corresponding triphenylmetal hydroxide is heated in one of the above-mentioned solvents with the tetrahalo phthalic acid anhydride or free tetrahalo phthalic acid. Stereo hinderance causes, only one carboxyl group of the tetrahalogen phthalic acid to react with the triphenyl tin or triphenyl lead group.

The remaining compounds are prepared by first converting with an alcohol to a tetrahalo phthalic acid half ester. This reaction can be conducted in a solvent or as a melt. The neutralization of the second carboxyl group with a trialkyltin, triphenyltin or triphenyllead group is produced by the corresponding triorganometal oxide or hydroxide. When the second hydroxyl group is reacted to form a trialkyllead compound, it is best conducted using the corresponding trialkyllead acetate in the presence of soda, as described above.

The tetrahalo phthalic acid anhydrides or phthalic acids used as starting materials are very readily available. Tetrachlorine and tetrabromine phthalic acid anhydrides are commercially available; and tetraiodine phthalic acid anhydride is simple to prepare from phthalic acid anhydride, iodine and oil.

The tetrahalo phthalic acid half-ester derivatives are prepared from alcohols which are all known in the literature and most are available as commercial products.

The following compounds have been prepared. The details of preparation are found in the respective example as designated with a Roman numeral.

| No. | X | $R_1$ | $R_2$ |
|---|---|---|---|
| I | Cl | Sn(n-butyl)$_3$ | Sn(n-butyl)$_3$. |
| II | Cl | do | Methyl. |
| III | Cl | Sn(i-propyl)$_3$ | 3,7-dimethyloctyl. |
| IV | Cl | Sn(n-amyl)$_3$ | 3,6-dioxaoctyl. |
| V | Cl | Sn(i-butyl)$_3$ | 2,2,2-trichloroethyl. |
| VI | Cl | Pb(n-butyl)$_3$ | Pb(n-butyl)$_3$. |
| VII | Cl | do | 2-ethylhexyl. |
| VIII | Cl | do | 2-bromoethyl. |
| IX | Cl | Pb(n-propyl)$_3$ | β-(Phenoxy)-ethyl. |
| X | Cl | Sn(phenyl)$_3$ | H. |
| XI | Cl | do | n-Propyl. |
| XII | Cl | do | 2-octyldodecyl. |
| XIII | Cl | do | n-Octadecyl. |
| XIV | Cl | Pb(phenyl)$_3$ | H. |
| XV | Cl | do | Methyl. |
| XVI | Cl | do | 3,7,11-trimethyldodecyl. |
| XVII | Br | Sn(n-butyl)$_3$ | Sn-(n-butyl)$_3$. |
| XVIII | Br | Sn(i-amyl)$_3$ | 3-methoxybutyl. |
| XIX | Br | Sn(ethyl)$_3$ | 3,7-dimethyl-2,3,6,7-tetrachlorooctyl. |
| XX | Br | Pb(n-butyl)$_3$ | Pb-(n-butyl)$_3$. |
| XXI | Br | Pb(butyl)$_3$ | -Phenylethyl. |
| XXII | Br | Sn(phenyl)$_3$ | H. |
| XXIII | Br | do | Lauryl. |
| XXIV | I | Sn(n-butyl)$_3$ | Sn(n-butyl)$_3$. |
| XXV | I | do | 2-hexyldecyl. |
| XXVI | I | Sn(n-propyl)$_3$ | 3,6,9-trioxaundecyl. |
| XXVII | I | Sn(i-butyl)$_3$ | β-(4-chlorophenoxyethyl. |
| XXVIII | I | Sn(n-butyl)$_3$ | Geranyl. |
| XXIX | I | Pb(phenyl)$_3$ | H. |
| XXX | I | do | 3,7-dimethyloctyl. |

These substances may be divided into four groups based on their solubility and melting point. Since solubility is also a measure of compatibility in various substrates, this will provide a basis for selection of the proper biocide. The physical properties of the materials still varies widely.

Group A: Crystalline substances or crystallizable substances with relatively low melting point. Compounds I, II, VI, XI, XII, XIII, XVII, XX, XXIII and XXIV are examples. These compounds have good to very good solubility in all nonpolar and weakly polar solvents and their compatibility with organophilic substrates is therefore desirable. In water or water-like solutions (alcohols) as well as in organic solvents of high polarity (acetonitrile) they have poor to very poor solubility.

Group B: Crystalline compounds with a relatively high melting point or decomposition temperature. Compounds X, XIV, XV, XXII, and XXIX are examples. These substances are very difficult to dissolve in all conventional solvents, including water. They have very similar properties to pigments.

Group C: Amorphous substances with a viscous, oily to very sticky consistency and very slight tendency, if any, to crystallization. Crystallization is not possible by conventional methods. Compounds III, VIII, XIX, XXI, XXIII, XXV, XXVIII and XXX are examples. These compounds are extremely soluble in all homopolar solvents and in most cases, almost unlimited miscibility is noted. The compatibility in nonpolar and weakly polar substrates is outstanding.

Group D: In this group are the oxaalkyl derivatives of the type shown by compounds IV, IX, XVIII, XXVI, and XXVII. Depending upon the size of the oxaalkyl radical, these compounds are increasingly soluble in polar solvents. With increased length of an oxaalkyl radical, the ability to crystallization is lost and amorphous substances result. The compatibility with polar materials also increases with the length of the oxaalkyl radical.

The substances proposed according to the invention are excellent antifouling biocides for protection of ship hulls and harbor installations against growth of marine organisms. In this field of application, the synergism between biocidal anions and biocidal cations is especially interesting.

These materials can be used directly in know anti-fouling paints by selecting a compound having properties similar to an inorganic pigment, such as, substances that have lower solubilities and high melting points. Substantially all of group B is suitable.

The combination of compounds with each other as well as with known antifouling biocides offers further advantages.

In paint compositions that are developed for organic biocide components, practically all compounds in Groups A, C and D can be used. Compounds I, V, VI, XVII, XIX, XX and XXIV are especially suitable. Also, the combination with substances of Group B can be advantageous because it is possible to bring about a longer lasting effect.

Most compounds of the present invention are also outstandingly suited for addition to softeners or natural and synthetic macromolecular materials as biocides. Polyvinyl chloride and its copolymers as well as cellulose and its derivatives are examples. Obviously, for this purpose, compounds with a lower melting point or with an oily consistency are best (substances of Groups A, C and D).

In chlorine containing polymers or copolymers, the compounds of Groups A and C have an outstanding compatibility. This means that they themselves act as softeners and, that they do not, or practically do not, separate from the polymeric material.

Although organolead and also organotin compounds exhibit an observable toxicity toward warm blooded animals, they are useful without reservation because of physiological considerations in synthetic materials. Extremely low migration values in polyvinyl chloride softened with dioctylphthalate, for example, were found for compounds V, XII, XVI and XIX. A foil made of acetyl cellulose softened with acetyl citric acid ester exhibited very low migration of compounds IV, XVIII and XXVI. In corresponding foils treated with bis-(tri-n-butyltin)-oxide, there was an observable migration and loss of the organotin compound.

The compounds of the present invention are suited for biocidal treatment of rubber and vulcanized rubber products. They have good compatibility therewith and low migration therein. Because of the homopolar nature of rubber products, substances of the Groups A and C may be used.

Another very important use of the compounds of the present invention is the treatment of fabric and felt made of materials such as wool, cotton, silk, polyvinyl alcohol and mixtures thereof or in combination with other polymers, to prevent microbial rotting and to repel animal pests, such as rodents and insects. The outstanding tenactivity of these substances to the fabric combined with the strong action and very diversified action makes them very valuable.

Wood preservation is another important field of application. These compounds can be used in organophilic solvents, such as toluene or xylene, and also in aqueous substances as wood preservatives. In organophilic solvents, the compounds of Groups A, C and D may be used. For water-base impregnating materials, the compounds with oxaalkyl groups of types IV, XVII and XXVI are particularly useful and may be used in conjunction with a commercial surfactant. Naturally combinations with other impregnants, such as tar oil, pentachlorophenol or dialkyldithiocarbamates can be used. In this connection, the preservation of paper and cardboard can be effected with the substances here claimed under similar conditions. Cellulose pulp used for paper manufacture is easily attacked by slime molds. The compounds of the present invention are useful as antislime mold agents. Of special importance are the oxaalkyl derivatives such as compounds IV, XVII and XXVI. Combination with conventional biocides such as sodium chlorite, sodium hydrogen sulfite or chlorophenols can be beneficial. Biocidal protection of paper is also possible if the pigment-like substances are finely ground and added to the cellulose pulp.

The biocidal treatment of clear varnishes comprising varnish bases that can be biologically decomposed or that have softeners susceptable to biological attack is another use for the compounds of the present invention. Again, compounds of Group A, C and D are of particular importance.

The biocidal treatment of aqueous dispersion dyes to prevent destruction of coatings by microbes, especially outdoor paints which are particularly subject to attack, is also important. Obviously there will at the same time be preservation during storage. The compounds best suited for this use are IV, XVII and XXVI, which have oxaalkyl groups. However, the difficultly soluble pigment-like substances of Group B, such as X, XIV and XXII may be added if they are finely ground. The comminution and the distribution of the biocidal compound is advantageously combined with that of the paint pigments.

Finally, the use of these substances as medicinal disinfectants is important. The biocidal effect of the iodine containing substances is extremely great and combined with these, even the smallest doses of compounds of the present invention exhibit excellent biocidal action. Apparently the microbial activity of these substances is extraordinarily increased by a slow release of iodine. However, toxicity to warm blooded animals is unexpectedly low. Various disinfectants are available containing iodine which may be combined with tin compounds, such as XXIV, XXV, XXVII and XXVIII. These can be used successfully in both human and veterinary medicine for uses extending to combatting of ward infection in hospitals and the disinfection of animal stalls.

There are still many other special fields of application for the compounds of the present invention. A few of the other uses include steeping of seeds, combatting of bilharziosis, preventing destruction of trees by game, treatment of worm diseases, such as chicken parasitic worms.

Example I: Di-(tri-n-butyltin)-3,4,5,6-tetrachlorophthalate

A mixture of 28.6 parts tetrachlorophthalic acid anhydride, 59.6 parts bis-(tri-n-butyltin)-oxide and 150 parts benzene was heated for 30 minutes with agitation; the solvent was distilled off in a vacuum and the residue was crystallized from a mixture 1-propanol/water.

Yield: 85 parts (96% of the theoretical). Colorless crystals with melting point 72–74° C. Very good solubility in all ordinary solvents, except water.

Calculated (percent): Sn, 26.9; Cl, 16.1. Found (percent): Sn, 27.0; Cl, 15.7.

Example II: 2-[(tri-n-butyltin)-carboxy]-3,4,5,6-tetrachlorobenzoic acid methyl ester 57 parts tetrachlorophthalic acid anhydride, 7.5 parts methanol and 100 parts toluene were heated for 3 hours under reflux with agitation. Then 59.6 parts bis-(tri-n-butyltin)-oxide were added and heated under reflux for 30 minutes. Then the solvent was distilled off under a vacuum and the residue crystallized from heptane.

Yield: 101 parts (83% of the theoretical). Colorless crystals with melting point 83–86° C. Very good solubility in all ordinary solvents, with the exception of water.

Calculated (percent): Sn, 19.6; Cl, 23.4. Found (percent): Sn, 19.6; Cl, 24.0.

Example III: 2-[(tri-i-propyltin)-carboxy]-3,4,5,6-tetrachlorobenzoic acid-3,7-dimethyloctyl ester Synthesis under the conditions described in Example II using a mixture of:

| | Parts |
|---|---|
| Bis-(tri-i-propyltin)-oxide | 25.6 |
| Tetrachlorophthalic acid anhydride | 28.6 |
| 3,7-dimethyl-octanol-(1) | 15.8 |
| Toluene | 100 | yielded 66 parts (95% of the theoretical), a colorless, viscous, non-crystallizable mass having unlimited miscibility with almost all ordinary solvents except the lower alcohols (limited) and water (hardly at all).

Calculated (percent): Sn, 17.2; Cl, 20.5. Found (percent): Sn, 17.5; Cl, 20.1.

Example IV: 2-[(tri-i-amyltin)-carboxy]-3,4,5,6-tetrachlorobenzoic acid-3,6-dioxaoctyl ester Synthesis under the conditions described in Example II using a mixture of

| | Parts |
|---|---|
| Bis-(tri-i-amyltin)-oxide | 34 |
| Tetrachlorophthalic acid anhydride | 28.6 |
| 3,6-dioxa-octanol-(1) | 13.4 |
| Toluene | 100 | yielded 72 parts (96% of the theoretical) of a colorless, viscous, non-crystallizable mass having unlimited miscibility with all ordinary solvents including lower alcohols. Also the compound was soluble in aqueous solvents (aqueous alcohols, aqueous acetone), but only slightly soluble in pure water.

Calculated (percent): Sn, 15.8; Cl, 18.9. Found (percent): Sn, 15.4; Cl, 18.0.

Example V: 2-[(tri-i-butyltin)-carboxy]-3,4,5,6-tetrachlorobenzoic acid-2,2,2-trichloroethyl ester Synthesis under the condition described in Example II using a mixture of

| | Parts |
|---|---|
| Bis-(tri-i-butyltin)-oxide | 30 |
| Tetrachlorophthalic acid anhydride | 28.6 |
| 2,2,2-trichloroethanol | 14.8 |
| Toluene | 100 | yielded 65 parts (90% of the theoretical) of a colorless, viscous, non-crystallizable substance having unlimited miscibility with almost all ordinary solvents, excepting lower alcohols (limited) and water (hardly at all).

Calculated (percent): Sn, 16.4; Cl, 19.6. Found (percent): Sn, 16.0; Cl, 18.9.

Example VI: Di-(tri-n-butyllead)-3,4,5,6-tetrachlorophthalate

A mixture of 43.7 parts tri-n-butyllead acetate, 14.3 parts tetrachlorophthalic acid anhydride, 100 parts tetrahydrofuran and 10.6 parts sodium carbonate was heated under reflux for 2 hours with agitation. After cooling to room temperature, the undissolved sodium acetate was filtered off and the filtrate was freed of solvent under vacuum.

Yield: 42.5 parts (81.0% of the theoretical). Colorless crystals with melting point 100 to 102° C. crystallized from 1-propanol/water. Good to very good solubility in ordinary solvents, with the exception of water.

Calculated (percent): Pb, 39.1; Cl, 13.4. Found (percent): Pb, 38.4; Cl, 12.8.

Example VII: 2-[(tri-n-butyllead)-carboxy]-3,4,5,6-tetrachlorobenzoic acid-2-ethylhexyl ester 28.6 parts tetrachlorophthalic acid anhydride, 13.0 parts 2-ethylhexanol-(1) and 100 parts toluene were heated under reflux for 3 hours with agitation. Then 43.8 parts tri-n-butyllead acetate and 10.6 parts sodium carbonate were added and the mixture was heated for 1 hour under reflux. After cooling the insoluble sodium acetate was filtered off and the filtrate was freed of solvent.

Yield: 70 parts (89% of the theoretical). Colorless, viscous, non-crystallizable mass. Miscible in any proportion with all nonpolar and weakly polar solvents. Limitedly miscible with lower alcohols, soluble in water with difficulty.

Calculated (percent): Pb, 12.7; Cl, 15.2. Found (percent): Pb, 12.1; Cl, 14.3.

Example VIII: 2-[(tri-n-butyllead)-carboxy]-3,4,5,6-tetrachlorobenzoic acid-2-bromoethyl ester The synthesis under the conditions described in Example VII using a mixture of

| | Parts |
|---|---|
| Tri-n-butyllead acetate | 43.8 |
| Tetrachlorophthalic acid anhydride | 28.6 |
| 2-bromoethanol | 12.5 |
| Toluene | 100 |
| Sodium carbonate | 10.6 | yielded 68 parts (87% of the theoretical) of a colorless, oily, uncrystallizable substance which was miscible in any proportion with all nonpolar and weakly polar solvents, had limited miscibility with lower alcohols and was soluble in water with difficulty Calculated (percent): Pb, 26.3; Cl, 18.0. Found (percent): Pb, 25.7; Cl, 17.3.

Example IX: 2-[(tri-n-propyllead)-carboxy]-3,4,5,6-tetrachlorobenzoic acid-2-phenoxyethyl ester Synthesis under the conditions described in Example VII using a mixture of

| | Parts |
|---|---|
| Tri-n-propyllead acetate | 39.5 |
| Tetrachlorophthalic acid anhydride | 23.6 |
| 2-phenoxyethanol | 13.8 |
| Toluene | 100 |
| Sodium carbonate | 10.6 | yielded 71 parts (93% of the theoretical) of a colorless, very sticky, non-crystallizable substance which was miscible in any proportion with all nonpolar and weakly polar solvents, had limited miscibility with lower alcohols and was soluble in water difficultly.

Calculated (percent): Pb, 27.3; Cl, 18.7. Found (percent): Pb, 27.0; Cl, 18.2.

Example X: 2-[(triphenyltin)-carboxy]-3,4,5,6-tetrachlorobenzoic acid

A mixture of 28.6 parts tetrachlorophthalic acid anhydride, 36.7 parts triphenyltin hydroxide and 150 parts tetrahydrofuran was heated under reflux for 2 hours with agitation. A majority of the solvent was then distilled off in a vacuum and the product which separated was filtered.

Yield: 61 parts (94% of the theoretical). Colorless crystals, which decompose above 200° C. Very poor solubility in all conventional solvents, including water.

Calculated (percent): Sn, 18.2; Cl, 21.7. Found (percent): Sn, 17.1; Cl, 20.3.

Example XI: 2-[(triphenyltin)-carboxy]-3,4,5,6-tetrachlorobenzoic acid-n-propyl ester 28.6 parts tetrachlorophthalic acid anhydride, 6.0 parts n-propanol and 50 parts toluene were heated under reflux for 3 hours with agitation. Then, 36.7 parts triphenyltin hydroxide and 50 parts tetrahydrofuran were added and the mixture was heated under reflux for 2 hours. The solvent was then distilled off in vacuum.

Yield: 61 parts (88% of the theoretical). Colorless crystals with melting point 144-145° C. Good to moderately good solubility in all ordinary solvents and poor solubility in water Calculated (percent): Sn, 17.1; Cl, 20.4. Found (percent): Sn, 17.6; Cl, 20.8.

Example XII: 2-[(triphenyltin)-carboxy]-3,4,5,6-tetrachlorobenzoic acid-2-octyldodecyl ester 29.8 parts 2-octyldodecyl alcohol and 28.6 parts tetrachlorophthalic acid anhydride were heated for 10 minutes at 160-170° C. until melted. Then, 36.7 parts triphenyltin hydroxide were added and agitated until the solution became clear.

Yield: 93 parts (100% of the theoretical). Colorless, clear, very sticky mass, which exhibits cloudiness after a time resulting from partial crystallization. The cloudiness disappears upon heating. The compound can be obtained in crystalline form, by crystallization from heptane at −20° C. Because of the formation of mesaphases, the melting point is not sharp, however, about 100° C. melting is apparent.

Very good solubility in all nonpolar and weakly polar solvents, somewhat soluble in alcohols and poor solubility in water.

Calculated (percent): Sn, 12.7; Cl, 15.2. Found (percent): Sn, 12.5; Cl, 14.9.

Example XIII: 2-[(triphenyltin)-carboxy]-3,4,5,6-tetrachlorobenzoic acid-1-octadecyl ester Synthesis under the conditions described in Example XII using a mixture of

| | Parts |
|---|---|
| Triphenyltin hydroxide | 36.7 |
| Tetrachlorophthalic acid anhydride | 28.6 |
| 1-octadecanol | 27.0 | yielded 89 parts (98% of the theoretical) as a colorless, cloudy, waxy substance which has good solubility in all nonpolar and weakly polar solvents, especially with gentle heating; poor solubility in alcohols, very poor solubility in water. The compound can be obtained in crystalline form by crystallization from heptane with cooling. These crystals, when heated from mesaphases form a clear melt about 110° C.

Calculated (percent): Sn, 13.1; Cl, 15.7. Found (percent): Sn, 13.2; Cl, 15.4.

Example XIV: 2-[(triphenyllead)-carboxy]-3,4,5,6-tetrachlorobenzoic acid

Synthesis under the conditions described in Example X using a mixture of

| | Parts |
|---|---|
| Triphenyllead hydroxide | 22.8 |
| Tetrachlorophthalic acid anhydride | 14.3 |
| Tetrahydrofuran | 100 | yielded 36 parts (97% of the theoretical) of colorless crystals, which slowly decomposed about 220° C. and have poor solubility in all ordinary solvents, including water.

Calculated (percent): Pb, 27.9; Cl, 19.1. Found (percent): Pb, 27.1; Cl, 18.5.

Example XV: 2-[triphenyllead)-carboxyl]-3,4,5,6-tetrachlorobenzoic acid methyl ester Synthesis under the conditions described in Example II using 91 parts triphenyllead hydroxide instead of bis-(tri-n-butyltin)-oxide yielded 141 parts (93% of the theoretical) of colorless crystals precipitated from dioxane, which decompose at 240–243° C. and have poor solubility in all solvents, including water.

Calculated (percent): Pb, 27.4; Cl, 18.8. Found (percent): Pb, 26.7; Cl, 18.6.

Example XVI: 2-[(triphenyllead)-carboxy]-3,4,5,6-tetrachlorophthalic acid-3,7,11-trimethyldodecyl ester 22.8 parts 3,7,11-trimethyldodecanol and 28.6 parts tetrachlorophthalic acid anhydride were heated for 10 minutes at 160–170° C. until melted. After cooling, 100 parts toluene and 45.5 parts triphenyllead hydroxide were added and heated under reflux for 30 minutes with agitation. The solvent was then distilled off under vacuum.

Yield: 93 parts (98% of the theoretical). Colorless, sticky mass. Very readily soluble in all nonpolar and weakly polar solvents, especially with gentle heating. Poor solubility in alcohols and very poor solubility in water. This compound can be obtained in crystalline form by precipitation from heptane by cooling to —20° C. However, the crystals are smeary at room temperature and they do not have a sharp melting point.

Calculated (percent): Pb, 21.8; Cl, 14.9. Found (percent): Pb, 20.9; Cl, 14.0.

Example XVII: Di-(tri-n-butyltin)-tetrabromophthalate

Synthesis under conditions described in Example I using 46.4 parts tetrabromophthalic acid anhydride instead of tetrachlorophthalic acid anhydride yielded 100 parts (94% of the theoretical) of colorless crystals precipitated from 1-propanol having a melting point of 87–89° C. and which were very readily soluble in all ordinary solvents while poorly soluble in water.

Calculated (percent): Sn, 22.4; Br, 30.2. Found (percent): Sn, 22.8; Br, 29.7.

Example XVIII: 2-[(tri-i-amyltin)-carboxy]-3,4,5,6-tetrabromobenzoic acid-3-methoxybutyl ester Synthesis under the conditions described in Example I using a mixture of

| | Parts |
|---|---|
| Bi-(tri-i-amyltin)-oxide | 34 |
| Tetrabromophthalic acid anhydride | 46.4 |
| 3-methoxybutanol-(1) | 10.4 |
| Toluene | 100 | yielded 87 parts (97% of the theoretical) of a colorless sticky oil having unlimited miscibility with all nonpolar and weakly polar solvents and poor solubility in water. Crystallization is not possible.

Calculated (percent): Sn, 13.2; Br, 35.6. Found (percent): Sn, 12.9; Br, 35.1.

Example XIX: 2 - [(triethyltin)-carboxy]-3,4,5,6-tetrabromobenzoic acid - 3,7 - dimethyl-2,3,6,7-tetrachlorooctyl ester Synthesis under the conditions described in Example II using a mixture of

| | Parts |
|---|---|
| Bis-(triethyltin)-oxide | 21.4 |
| Tetrabromophthalic acid anhydride | 46.4 |
| 3,3-dimethyl-2,3,6,7-tetrachlorooctanol | 29.6 |
| Toluene | 100 | yielded 92 parts (96% of the theoretical) of a colorless, sticky oil that has no tendency to crystallization, is miscible in any proportion with all nonpolar and weakly polar solvents and has limited miscibility with alcohols. The oil has very poor solubility in water.

Calculated (percent): Sn, 12.3; Br, 33.1. Found (percent): Sn, 11.4; Br, 32.5.

Example XX: Bis-(tri-n-butyllead)-tetrabromophthalate

A mixture of 43.7 parts tri-n-butyllead acetate, 23.2 parts tetrabromophthalic acid anhydride, 100 parts acetone, 50 parts tetrahydrofuran and 10.6 parts sodium carbonate were heated under reflux with agitation for 2 hours. After cooling, the insoluble sodium acetate was filtered off and the filtrate was freed of solvent under vacuum.

Yielded: 56 parts (90% of the theoretical). Colorless crystals with a melting point of 115–118° C. were precipitated from 1-propanol. Easily to very easily soluble in all ordinary solvents. Poor solubility in water.

Calculated (percent): Pb, 33.5; Br, 25.8. Found (percent): Pb, 33.0; Br, 25.6.

Example XXI: 2 - [(tri-n-butyllead)-carboxy]-3,4,5,6-tetrabromobenzoic acid-2-phenylethyl ester Synthesis under the conditions described in Example VII using a mixture of

| | Parts |
|---|---|
| Tri-n-butyllead acetate | 43.8 |
| Tetrabromophthalic acid anhydride | 46.4 |
| 2-phenyl alcohol | 12.2 |
| Toluene | 100 |
| Sodium carbonate | 10.6 | yielded 89 parts (82% of the theoretical) of a colorless viscous oil which cannot be crystallized. The compound was miscible with all nonpolar and weakly polar solvents in any proportion and had very poor solubility in water.

Calculated (percent): Pb, 21.5; Br, 33.2. Found (percent): Pb, 21.3; Br, 32.4.

Example XXII: 2-[(triphenyltin)-carboxy]-3,4,5,6-tetrabromobenzoic acid

Synthesis under the conditions described under Example X using a mixture of

| | Parts |
|---|---|
| Tetrabromophthalic acid anhydride | 46.4 |
| Triphenyltin hydroxide | 36.7 |
| Tetrahydrofuran | 100 | yielded 81.2 parts (98% of the theoretical) as colorless crystals that slowly decompose about 240° C. and have poor solubility in all ordinary solvents, including water.

Calculated (percent): Sn, 14.3; Br, 38.5. Found (percent): Sn, 14.0; Br, 37.9.

Example XXIII: 2-[(triphenyltin)-carboxy]-3,4,5,6-tetrabromobenzoic acid lauryl ester Synthesis under the conditions described in Example XII using a mixture of

| | Parts |
|---|---|
| Triphenyltin hydroxide | 36.7 |
| Tetrabromophthalic acid anhydride | 46.4 |
| Lauryl alcohol | 18.6 | yielded 97 parts (97% of the theoretical) of a colorless, waxy mass without distinct melting point which was easily soluble in all nonpolar and weakly polar solvents and had very poor solubility in water.

Calculated (percent): Sn, 11.9; Br, 32.0. Found (percent): Sn, 11.5; Br, 31.5.

Example XXIV: Di-(tri-n-butyltin)-tetraiodophthalate

Synthesis under conditions described in Example I using 65.2 tetraiodophthalic acid anhydride instead of tetrachlorophthalic acid anhydride yielded 118 parts (95% of the theoretical) as yellowish crystals precipitated from acetone. The crystals sinter at 85° C. and form a clear melt at 100° C. They have very good solubility in all ordinary solvents and have poor solubility in water.

Calculated (percent): Sn, 19.0; I, 40.8. Found (percent): Sn, 18.6; I, 40.0.

Example XXV: 2-[(tri-n-butyltin)-carboxy]-3,4,5,6-tetraiodobenzoic acid-2-hexyldecyl ester Synthesis under conditions described in Example II using a mixture of

| | Parts |
|---|---|
| Bis-(tri-n-butyltin)-oxide | 30 |
| Tetraiodophthalic acid anhydride | 65.2 |
| 2-hexyldecanol | 24.2 |
| Toluene | 100 | yielded 115 parts (98% of the theoretical) of a yellowish, sticky, waxy mass, which does not crystallize completely. The crystals which are obtained by precipitation from heptane at −20° C. are smeary at room temperature and do not exhibit a sharp melting point. They have good to very good solubility in all ordinary solvent and poor solubility in water.

Calculated (percent): Sn, 10.0; I, 42.9. Found (percent): Sn, 9.7; I, 42.1.

Example XXVI: 2-([tri-n-propyltin)-carboxy]-3,4,5,6-tetraiodobenzoic acid-3,6,9-trioxaundecyl ester Synthesis under conditions described in Example II using a mixture of

| | Parts |
|---|---|
| Bis-(tri-n-propyltin)-oxide | 12.8 |
| Tetraiodophthalic acid anhydride | 32.6 |
| 3,6,9-trioxaundecanol-(1) | 8.9 |
| Toluene | 100 | yielded 51 parts (95% of the theoretical) of a yellowish, clear, sticky substance which cannot be crystallized and is readily soluble in all usual solvents, including aqueous solvent solutions (alcohols, acetone).

Calculated (percent): Sn, 11.0; I, 47.1. Found (percent): Sn, 10.0; I, 46.4.

Example XXVII: 2-[(tri-i-butyltin)-carboxy]-3,4,5,6-tetraiodobenzoic acid-2-(4-chlorophenoxy)-ethyl ester Synthesis under conditions described in Example II using a mixture of

| | Parts |
|---|---|
| Bis-(tri-i-butyltin)-oxide | 15 |
| Tetraiodophthalic acid anhydride | 32.6 |
| 2-(4-chlorophenoxy)-ethanol | 8.6 |
| Toluene | 100 | yielded 54 parts (97% of the theoretical) of a yellowish, highly viscous oil which cannot be crystallized and is miscible with practically all ordinary solvents with very poor solubility in water.

Calculated (percent): Sn, 10.7; I, 45.6. Found (percent): Sn, 10.1; I, 44.8.

Example XXVIII: 2-[(tri-n-butyltin)-carboxy]-3,4,5,6-tetraiodobenzoic acid-3,7-dimethyl-2,6-octadienyl ester Synthesis under conditions according to Example II using a mixture of

| | Parts |
|---|---|
| Bis-(tri-n-butyltin)-oxide | 15 |
| Tetraiodophthalic acid anhydride | 32.6 |
| 3,7-dimethyl-2,6-octadienol-(1) | 7.7 |
| Toluene | 100 | yielded 51 parts (93% of the theoretical) as a yellowish, highly viscous, noncrystallizable oil which had unlimitedly miscibility with practically all ordinary solvents and had very poor solubility in water.

Calculated (percent): Sn, 10.8; I, 46.4. Found (percent): Sn, 10.4; I, 45.9.

Example XXIX: 2-[(triphenyllead)carboxy]-3,4,5,6-tetraiodobenzoic acid

Synthesis under conditions described in Example X using a mixture of

| | Parts |
|---|---|
| Tetraiodophthalic acid anhydride | 32.6 |
| Triphenyllead hydroxide | 22.8 |
| Methanol | 100 | yielded 53.2 part (95% of the theoretical) of yellowish crystals that decompose slowly above 210° C. have poor solubility in all ordinary solvents, including water.

Calculated (percent): Pb, 18.7; I, 45.9. Found (percent): Pb, 18.1; I, 44.1.

Example XXX: 2-(triphenyllead)-carboxy-3,4,5,6-tetraiodobenzoic acid-3,7-dimethyloctyl ester Synthesis during the conditions described in Example XVI using a mixture of

| | Parts |
|---|---|
| Triphenyllead hydroxide | 22.8 |
| 3,7-dimethyloctanol-(1) | 7.9 |
| Tetraiodophthalic acid anhydride | 32.6 |
| Toluene | 100 | yielded 58 parts (94% of the theoretical) of a yellowish, sticky, waxy mass, which does not completely crystallize and is easily to very easily soluble in all ordinary solvents but poorly soluble in water.

Calculated (percent): Pb, 16.6; I, 40.7. Found (percent): Pb, 15.4; I, 39.9.

We claim:

1. A compound corresponding to the formula $$X-\underset{X}{\underset{|}{\overset{\overset{X}{|}}{\bigcirc}}}\begin{matrix}-COR_1\\-COR_2\end{matrix}$$

wherein X is selected from the group consisting of chlorine, bromine and iodine, $R_1$ is selected from the group consisting of —Sn(R')$_3$ and —Pb(R')$_3$ R' being an alkyl having 2 to 5 carbons or phenyl, $R_2$ is selected from the group consisting of alkyl having 1 to 20 carbons, alkenyl, oxalkyl, phenyl, phenoxaalkyl and $R_1$ and R' is an alkyl radial, $R_2$ is selected form the group consisting of H, alkyl having 1 to 20 carbons, alkenyl, oxalkyl, phenyl and phenoxaalkyl when R' is phenyl, and wherein the radicals of $R_2$ may contain up to 4 chlorine, bromine or phenyl.

2. A compound of claim 1 wherein $R_1$ is selected from the group consisting of —Sn(C$_2$H$_5$)$_3$, —Sn(C$_3$H$_7$)$_3$, —Sn(C$_4$H$_9$)$_3$ and —Sn(C$_5$H$_{11}$)$_3$.

3. A compound of claim 1 wherein $R_1$ is selected from the group consisting of —Pb(C$_3$H$_7$)$_3$ and —Pb(C$_4$H$_9$)$_3$.

4. A compound of claim 2 wherein $R_2$ is selected from the group consisting of methyl, propyl, 2-ethylhexyl, 3,7-dimethyloctyl, lauryl, 2-hexadecyl, 3,7,11-trimethyldodecyl, β-phenylethyl, octadecyl, octadodecyl, 2,2,2-trichloroethyl, 2-bromoethyl, 3,7-dimethyl-2,3,6,7-tetrachlorooctyl, 3-methoxybutyl, 3,6-dioxaoctyl, 3,6,9-trioxaundecyl, (phenoxy)-ethyl, β-(4-chlorophenoxy) ethyl, geranyl and a trialkyltin radical corresponding to $R_1$.

5. A compound of claim 3 wherein $R_2$ is selected from the group consisting of methyl, propyl, 2-ethylhexyl, 3,7-dimethylloctyl, lauryl, 2-hexadecyl, 3,7,11-trimethylodecyl, phenylethyl, octadecyl, octadodecyl, 2,2,2-trichloroethyl, 2-bromoethyl, 3,7-dimethyl-2,3,6,7-tetrachlorooctyl, 3-methoxybutyl, 3,6-dioxaoctyl, 3,6,9-trioxaundecyl, β-(phenoxy)-ethyl, β-(4-chlorophenoxy) ethyl, geranyl and a trialkyllead radical corresponding to $R_1$.

6. A compound of claim 1 wherein $R_1$ is —SN(C$_6$H$_5$)$_3$.

7. A compound of claim 1 wherein $R_1$ is Pb(C$_6$H$_5$)$_3$.

8. A compound of claim 6 wherein $R_2$ is selected from the group consisting H, methyl, propyl, 2-ethylhexyl, 3,7-dimethylloctyl, lauryl, 2-hexadecyl, 3,7,11-trimethyldodecyl, β-phenylethyl, octadecyl, octadodecyl, 2,2,2-trichloroethyl, 2-bromoethyl, 3,7-dimethyl, 2,3,6,7-tetrachlorooctyl, 3-methoxybutyl, 3,6-dioxaoctyl, 3,6,9-trioxaundecyl, β-(phenoxy)-ethyl, β-(4-chlorophenoxy) ethyl and geranyl.

9. A compound of claim 7 wherein $R_2$ is selected from the group consisting H, methyl, propyl, 2-ethylhexyl, 3,7-dimethyloctyl, lauryl, 2-hexadecyl, 3,7,11-trimethyldodecyl, -phenylethyl, octadecyl, octadodecyl, 2,2,2-trichloroethyl, 2-bromoethyl, 3,7-dimethyl, 2,3,6,7-tetrachlorooctyl, 3-methoxybutyl, 3,6-dioxaoctyl, 3,6,9-trioxaundecyl, β-(phenoxy)-ethyl, β-(4-chlorophenoxy) ethyl and geranyl.

10. A compound of claim 1 selected from the group consisting of di-(tri-n-butyltin)-3,4,5,6-tetrachlorophthalate,
2-[(tri-n-butyltin)-carboxy]-3,4,5,6-tetrachlorobenzoic acid methyl ester,
2-[(tri-i-propyltin)-carboxy]-3,4,5,6-tetrachlorobenzoic acid-37-dimethyloctyl ester,
2-[(tri-i-butyltin)carboxy]-3,4,5,6-tetrachlorobenzoic acid-2,2,2-trichloroethyl,
di-(tri-butyllead)-3,4,5,6-tetrachlorophthalate,
2-[(tri-n-butyllead)-carboxy]-3,4,5,6-tetrachlorobenzoic acid-2-ethylhexyl ester,
2-[(tri-n-butyllead)-carboxy]-3,4,5,6-tetrachlorobenzoic acid-2-bromoethyl ester,
2-[(tri-n-propyllead)carboxy]3,4,5,6-tetrachlorobenzoic acid-2 phenoxyethyl ester,
2-[(triphenyltin)-carboxy]-3,4,5,6-tetrachlorobenzoic acid,
2-[(triphenyltin)-carboxy]-3,4,5,6-tetrachlorobenzoic acid-n-propyl ester,
2-[(triphenyltin)-carboxy]-3,4,5,6-tetrachlorobenzoic acid-2-octyldodecyl ester,
2-[(triphenyltin)-carboxy]-34,5,6-tetrachlorobenzoic acid-2-octyldodecyl ester,
2-[(triphenyltin)-carboxy]-3,4,5,6-tetrachlorobenzoic acid-1-octadecyl ester,
2-[(triphenyllead)-carboxy]-3,4,5,6-tetrachlorobenzoic acid,
2-[(triphenyllead)-carmoxy]-3,4,5,6-tetrachlorobenzoic acid methyl ester,
2-[(triphenyllead)-carboxy]-3,4,5,6-tetrachloroacid-3,7,11-trimethyldodecyl ester,
di-(tri-n-butyltin)-tetrabromophthalate,
2-[(tri-i-amyltin)-carboxy]-3,4,5,6-tetrabromobenzoic acid-3-methoxybutyl ester,
2-[(triethyltin)carboxy]-3,4,5,6-tetrabromobenzoic acid-3,7-dimethyl-2,3,6,7-tetrachlorooctyl ester,
di-(tri-n-butyllead)-tetrabromophthalate,
2-[(tri-n-butyllead)-carboxy]-3,4,5,6-tetrabromobenzoic acid-2-phenylethyl ester,
2-[(triphenyltin)-carboxy]-3,4,5,6-tetrabromobenzoic acid,
2-[(triphenyltin)-carboxy]-3,4,5,6-tetrabromobenzoic acid lauryl ester,
2-[(triphenyllead)-carboxy]3,4,5,6-tetraiodobenzoic acid,
2-[(triphenyllead)-carboxyl-3,4,5,6-tetraiodobenzoic acid-3,7-dimethyloctyl ester,
2-[(tri-n-propyltin)-carboxy]-3,4,5,6-tetraiodobenzoic acid-3,6,9-trioxaundecyl ester,
2-[(tri-i-butyltin)-carbox$^y$]-3,4,5,6-tetraiodobenzoic acid-2-(4-chlorophenoxy)-ethyl ester,
2-[(tri-n-butyltin)-carboxy]-3,4,5,6-tetraiodobenzoic acid-3,7-dimethyl-2,6-octadienyl ester,
di-(tri-n-butyltin)-tetraiodophthalate and
2-[(tri-n-butyltin.)-carboxy]-3,4,5,6-tetraiodobenzoic acid-2-hexyldecyl ester.

References Cited

UNITED STATES PATENTS

| | | | |
|---|---|---|---|
| 3,214,453 | 10/1965 | Stern | 260—429.7 |
| 3,479,380 | 11/1969 | Minieri | 260—429.7 |
| 3,142,614 | 7/1964 | Ligett | 260—437 R |
| 3,417,113 | 12/1968 | Overmars | 260—437 R |

DANIEL E. WYMAN, Primary Examiner

W. F. W. BELLAMY, Assistant Examiner

U.S. Cl. X.R.

260—437 R; 424—288, 293